United States Patent [19]
Reckler

[11] 3,943,653
[45] Mar. 16, 1976

[54] FISHING LINE RUDDER
[76] Inventor: Lawrence L. Reckler, 984 Bates Ave., Reno, Nev. 89502
[22] Filed: Apr. 25, 1975
[21] Appl. No.: 571,541

[52] U.S. Cl.............................. 43/43.13; 43/43.14
[51] Int. Cl.².................................. A01K 95/00
[58] Field of Search............ 43/43.13, 43.14, 42.22, 43/42.06, 43.12, 42.41, 42.4

[56] References Cited
UNITED STATES PATENTS

| | | | |
|---|---|---|---|
| 2,036,954 | 4/1936 | Murray | 43/43.13 |
| 2,680,927 | 6/1954 | Napier et al. | 43/42.22 |
| 3,309,811 | 3/1967 | Wimer | 43/42.06 |
| 3,466,787 | 9/1969 | Collins | 43/43.13 |
| 3,568,355 | 3/1971 | Hassell | 43/43.14 |

Primary Examiner—Warner H. Camp
Attorney, Agent, or Firm—Roger B. Webster

[57] ABSTRACT

The rudder comprises a thin, flat rudder vane disposed vertically and arranged for connection at the front end to a trolling line, and for coupling at a rearward point by an included swivel to a leader extending rearwardly to a trailing lure; the rudder vane including a receptacle extending along its lower edge for reception of a selected number of weights to stabilize the vane and control its running depth as well as that of the trailing lure, and a shroud on the upper edge of the vane encompasses the swivel in protective relation without interfering with the normal function of such swivel.

5 Claims, 4 Drawing Figures

FISHING LINE RUDDER

BACKGROUND OF THE INVENTION

In the use of conventional fishing line rudders, it is the usual practice to affix—inconveniently and not always with effective results—depth control weights to the line or leader, while the swivel—as coupled between the rudder and leader—is wholly exposed and hence subject to tangling as well as wear and tear on its working parts due to the intrusion of foreign substances such as sand, silt, and other abrasive materials. The present invention was conceived in a successful effort to avoid such inconvenience and overcome such problem.

SUMMARY OF THE INVENTION

The present invention provides, as a major object—a fishing line rudder which comprises a thin, flat rudder vane disposed vertically and arranged for connection at the front end to a trolling line, and for coupling at a rearward point by an included swivel to a leader extending rearwardly to a trailing lure; the rudder vane including a receptacle extending along its lower edge for reception of a selected number of weights to stabilize the vane and control its running depth as well as that of the trailing lure, and a shroud on the upper edge of the vane encompasses the swivel in protective relation without interfering with the normal function of such swivel.

The present invention provides, as another important object, a fishing line rudder, as above, wherein the receptacle for the weights includes an access opening normally closed by a gate; the gate being movable to an open position whereby to permit the insertion of weights into, or removal from, the receptacle as fishing conditions may require.

The present invention provides, as a further object, a fishing line rudder which is designed for ease and economy of manufacture.

The present invention provides, as a still further object, a practical, reliable, and durable fishing line rudder, and one which is exceedingly effective for the purpose for which it is designed.

DESCRIPTION OF THE PREFERRED EMBODIMENT

Figure 1:
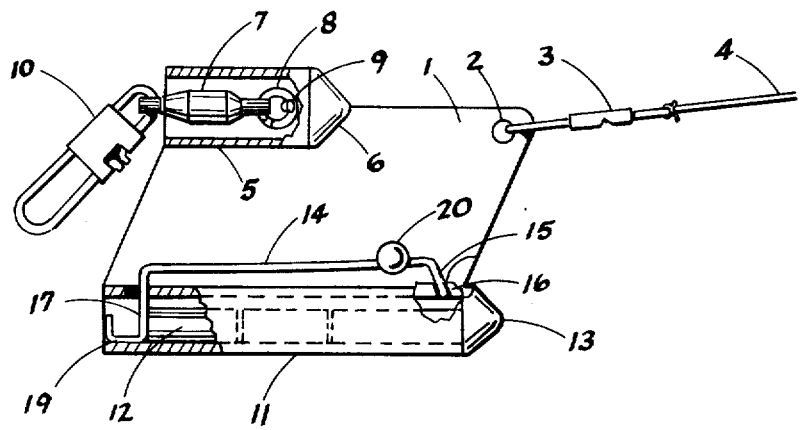
FIG. 1 is a side elevation—partly broken away and in section—of the fishing line rudder; the weight retention gate being shown in closed position.
Figure 2:
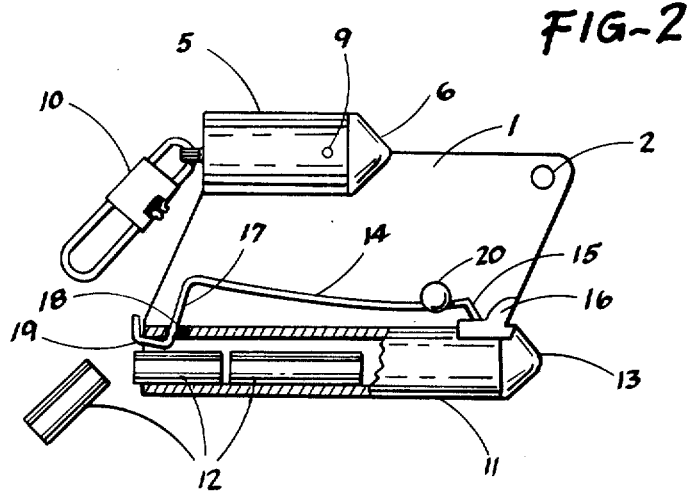
FIG. 2 is a similar view, but with such gate shown in open position.
Figure 3:
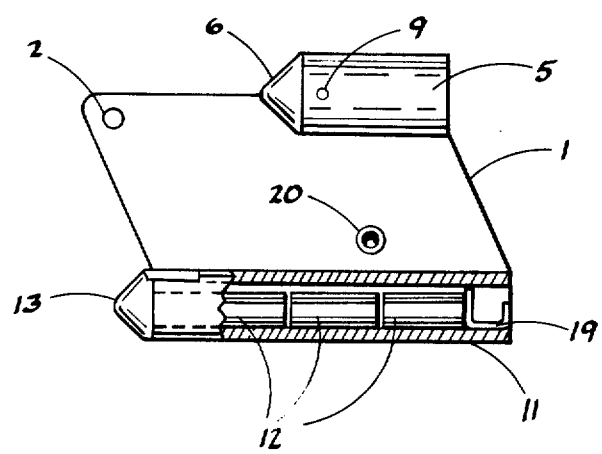
FIG. 3 is an elevation—partly broken away and in section—of the opposite side of the fishing line rudder.
Figure 4:
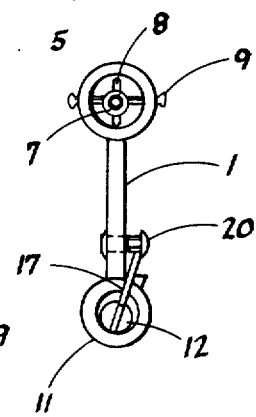
FIG. 4 is a rear end elevation of the same.

Referring now more particularly to the drawings and to the characters of reference marked thereon, my improved fishing rudder comprises a thin, flat rudder vane 1 disposed vertically or upright and—in side elevation—being generally in the form of a rhomboid parallelogram.

At the forward upper corner, the rudder vane 1 is provided with a transverse hole 2 adapted for connection of a snap 3 on the outer end of a fishing line 4 leading from a reel (not shown).

A short, longitudinal tubular shroud 5 is partially recessed into, and extends in fixed relation along, the upper rear edge portion of the rudder vane 1; such shroud 5 being open at the rear end, and permanently closed at the front end by a conical head 6.

A swivel 7, preferably of barrel-type, is disposed lengthwise mainly within the shroud 5, and—at its inner or forward end—such swivel is connected, by a ring 8, to a cross pin 9 which extends through such shroud. At its outer or rear end, the swivel is coupled to a snap 10 adapted for attachment to a leader (not shown) having a lure on its trailing end.

In use, with the rudder vane 1 connected between line 4 and the leader as above described, the swivel 7 prevents any twisting or torque, as imparted to the leader by the lure, from being transmitted to the rudder vane 1, and the rudder vane always runs in the water in an upright, non-rotating position which assures of non-twisting of line 4. At the same time, the swivel 7, as protected by the shroud 5, is maintained free of entanglement and is not readily subject to infiltration into its working parts of damaging foreign substances such as sand, silt, and other abrasive materials.

To control the running depth of the fishing line rudder, as well as to further assure of its stability in use, the following weighting arrangement is provided at the lower edge of the rudder vane 1:

An elongated tubular receptacle 11 extends in fixed relation along the lower edge of the rudder vane 1 and contains a number of relatively short, end-to-end cylindrical weights 12 preferably of lead. The front end of the receptacle 11 is permanently closed by a conical head 13 which minimizes drag, while the rear end of said receptacle is initially open at the rear end, but normally closed—to prevent escape of the weights—as will now appear.

An elongated spring metal wire 14 extends closely along one side of the rudder vane 1; such wire having a downturned front end tip 15 which bears on a stop 16. A downturned leg 17 on the rear end of wire 14 normally extends through a hole 18 in the top of the receptacle 11 and then—in gate forming relation—spans downwardly across the intially open rear end portion of said receptacle. A foot 19 on the lower end of leg 17 prevents such leg from escaping upwardly from hole 18. The spring metal wire 14 is engaged, under load, beneath a lateral fulcrum pin 20 on rudder vane 1 immediately rearwardly of the tip 15; the wire—because of such loading—normally but yieldably urging the gate-forming leg 17 in a downward position spanning across the rear end portion of the receptacle whereby weights 12 cannot accidentally escape.

When it is desired to add weights to, or remove them from, the receptacle 11, the spring metal wire 14 is manually sprung upwardly at the rear, and which draws the gate-forming leg 17 upwardly to an out-of-the-way position so that weights can be removed from, or be placed in, said receptacle. Thus, by a simple manual operation, weighting of the rudder vane can be varied as conditions of use may require.

From the foregoing description, it will be readily seen that there has been produced such a fishing line rudder as substantially fulfills the objects of the invention, as set forth herein.

While this specification sets forth in detail the present and preferred construction of the fishing line rudder, still in practice such deviations from such detail may be resorted to as do not form a departure from the spirit of the invention as defined by the appended claims.

I claim:

1. A fishing line rudder comprising a thin, flat rudder vane adapted to be connected at the front to a fishing line and normally disposed in a vertical running position, means adapted to couple the rudder vane at a rearward point to a leader trailing a lure, a weight-receiving receptacle on the rudder vane in proximity to its lower edge, the receptacle having an access opening to permit the placement of weights in or removal thereof from said receptacle, and movable means normally closing said access opening; the receptacle being tubular and extending in fixed relation longitudinally of said lower edge of the rudder vane, the open rear end portion of such tubular receptacle providing such access opening, and said movable means being a spring-urged gate spanning transversely across said rear end portion of the tubular receptacle in closing relation thereto.

2. A fishing line rudder, as in claim 1, including a spring-metal wire extending along one side of the rudder vane, a down-turned leg on the rear end of said wire, the leg forming said gate, and means mounting the spring-metal wire under load in a direction which yieldably urges the leg to a gate-forming position relative to said rear end portion of the tubular receptacle.

3. A fishing line rudder, as in claim 2, in which the spring-metal wire mounting means includes a down-turned tip on the front end of the wire, a stop on the rudder vane engaged by said tip, and a fulcrum pin on and projecting laterally from the rudder vane in a position engaging and loading the wire from above at a point intermediate its ends.

4. A fishing line rudder comprising a thin, flat rudder vane adapted to be connected at the front to a fishing line and normally disposed in a vertical running position, means adapted to couple the ruder vane at a rearward point to a leader trailing a lure, a weight-receiving receptacle on the rudder vane in proximity to its lower edge, the receptacle having an access opening to permit the placement of weights in or removal thereof from said receptacle, and movable means normally closing said access opening; said coupling means comprising a tubular shroud extending in fixed relation lengthwise of the rear, upper edge portion of the rudder vane, said shroud being closed at the front end and open at the rear end, a longitudinal swivel disposed in the main in the shroud, a connection between the front end of the swivel and the shroud, and an element at the rear end of the swivel adapted to attach to the leader, the connection between the swivel and shroud comprising a ring on the front end of the swivel and a cross pin in the shroud extending through the ring.

5. A fishing line rudder comprising a thin, flat rudder vane adapted to be connected at the front to a fishing line and normally disposed in a vertical running position, means adapted to couple the rudder vane at a rearward point to a leader trailing a lure, a weight-receiving receptacle on the rudder vane in proximity to its lower edge, the receptacle having an access opening to permit the placement of weights in or removal thereof from said receptacle, and movable means normally closing said access opening; said coupling means comprising a longitudinal, tubular shroud fixed on the rudder vane adjacent its upper edge, the shroud being closed at the front end and open at the rear end, and a longitudinal swivel disposed in the main in the shroud, the front end of the swivel being connected to said shroud internally thereof, and the rear end of the swivel being adapted to couple to the leader; and said receptacle being tubular and extending in fixed relation longitudinally of said lower edge of the rudder vane, the front end of the receptacle being closed and the rear end portion thereof providing such access opening, and said movable means being a spring-urged gate yieldably spanning across such access opening; there being a plurality of cylindrical weights disposed end-to-end in the receptacle.

* * * * *